Sept. 29, 1953     J. C. ELGIN ET AL     2,653,348
EXTRUSION APPARATUS UTILIZABLE FOR RECLAIMING RUBBER
Filed July 13, 1948     4 Sheets-Sheet 4
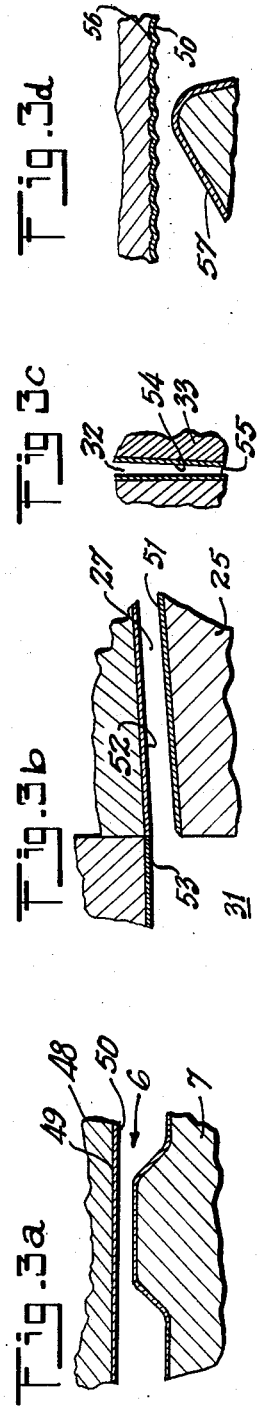
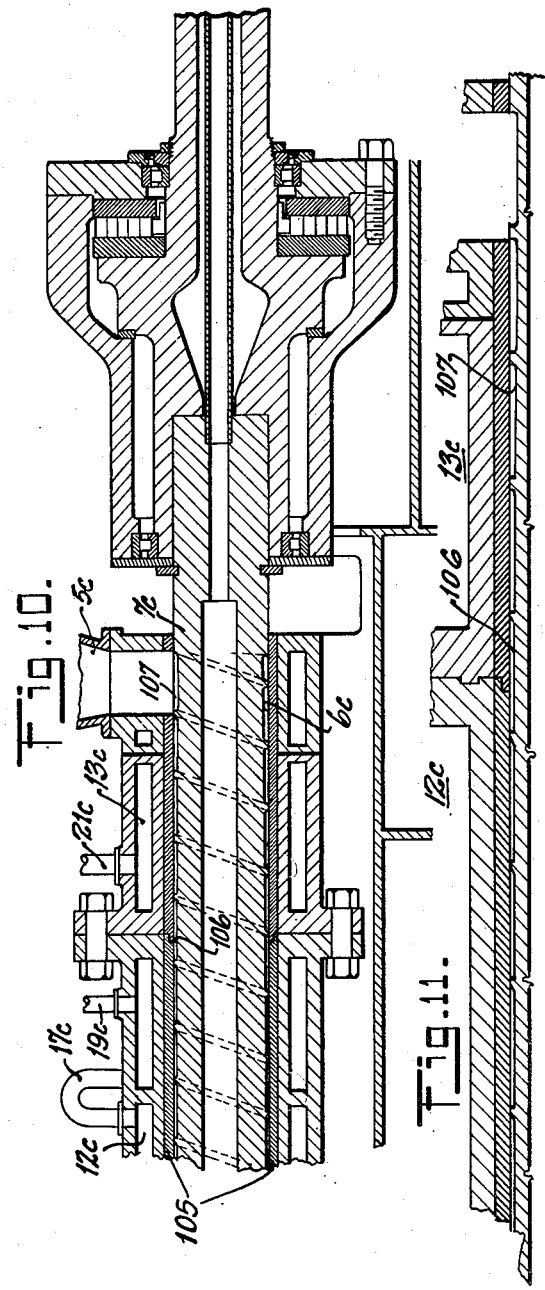
INVENTORS
JOSEPH CLIFTON ELGIN
EDWARD F. SVERDRUP
BY
ATTORNEYS

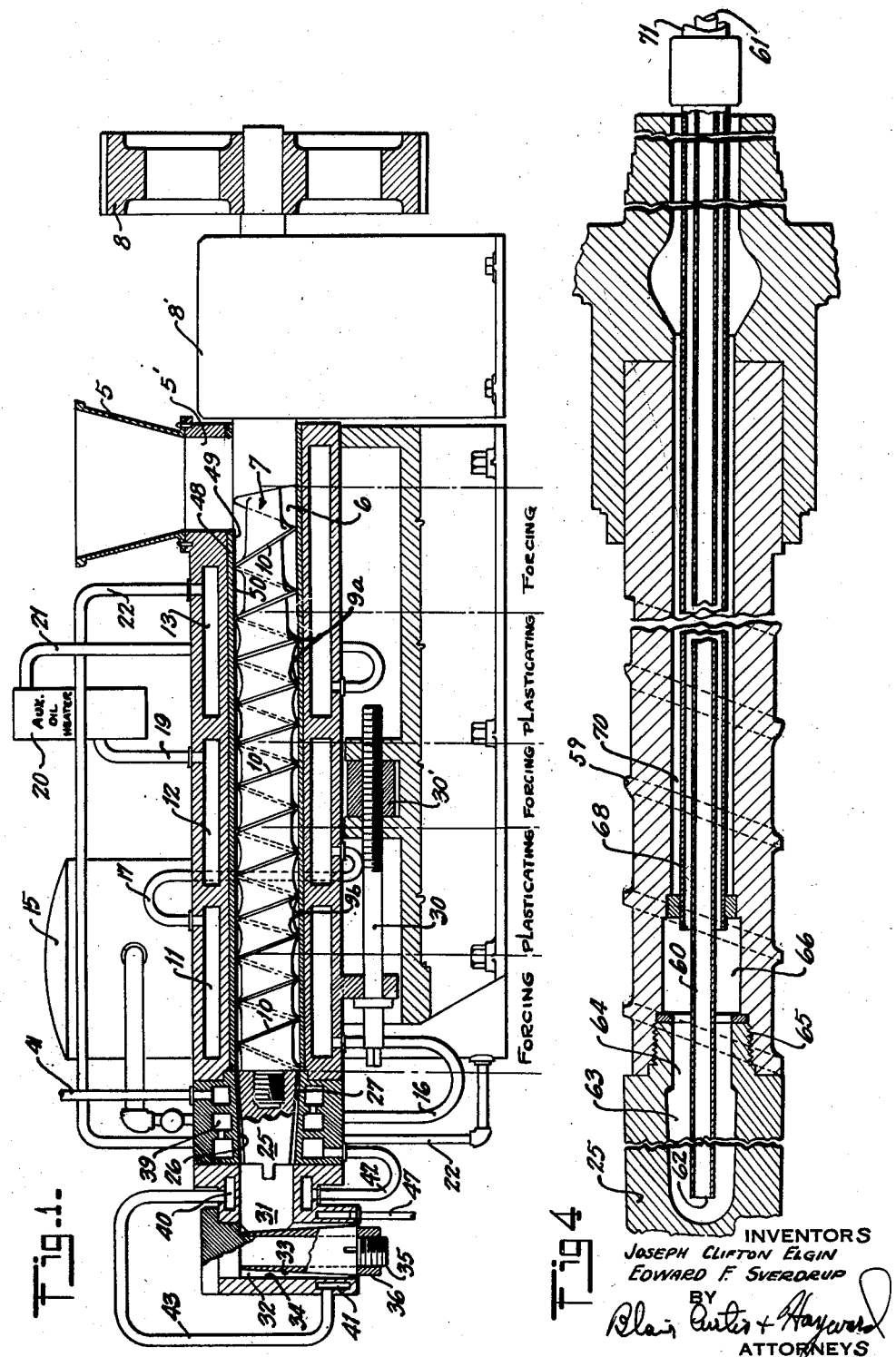

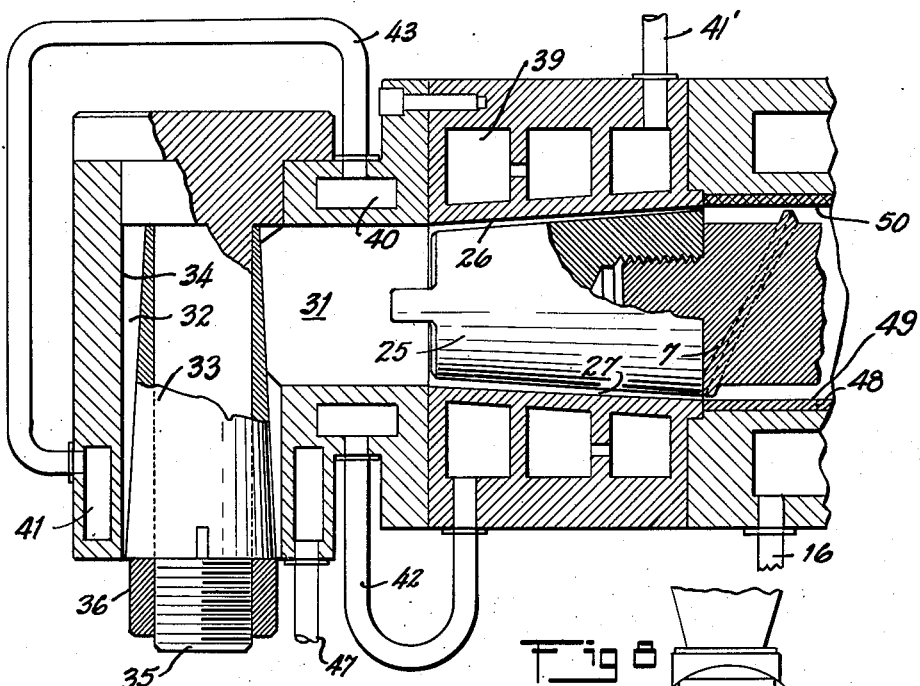
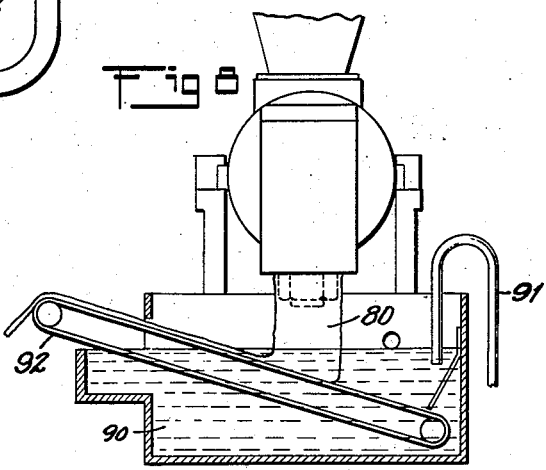
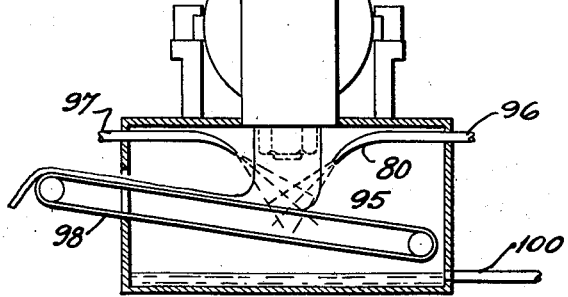

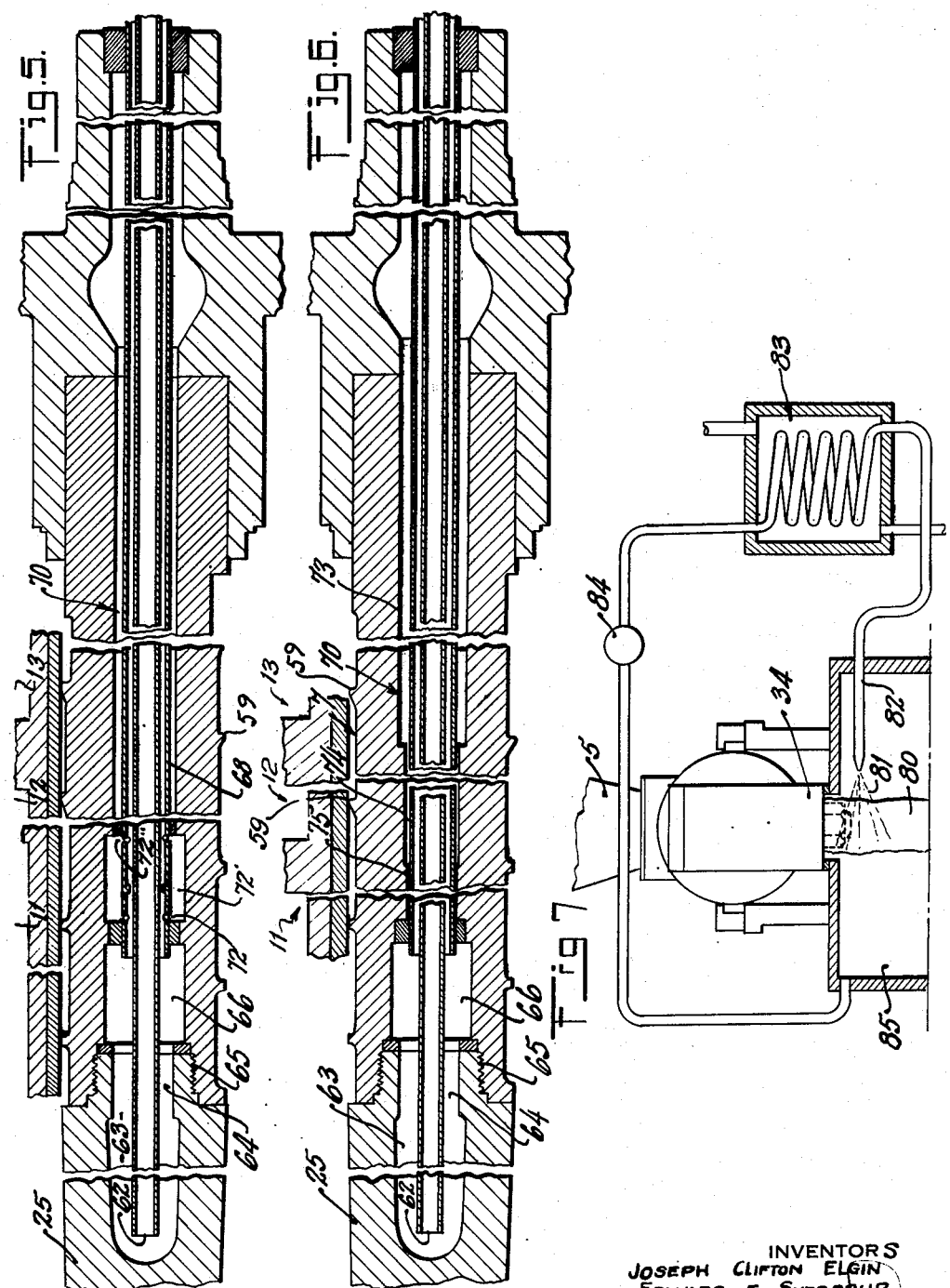

UNITED STATES PATENT OFFICE 2,653,348

EXTRUSION APPARATUS UTILIZABLE FOR RECLAIMING RUBBER

Joseph C. Elgin, Princeton, N. J., and Edward F. Sverdrup, Buffalo, N. Y., assignors to U. S. Rubber Reclaiming Company, Inc., Buffalo, N. Y.

Application July 13, 1948, Serial No. 38,474

16 Claims. (Cl. 18—12)

1

This invention relates to extrusion means for reclaiming rubber. An object of the invention is the provision of improved means for reclaiming vulcanized natural and artificial rubber and the like. Among the other objects of the invention are the provision of means whereby a fully standardized high quality reclaim may be produced, whereby operating conditions may be effectively controlled, and which will provide in a high degree such desiderata as long life, reliability, small space and labor requirements, and uniformity of performance. Still other objects will be in part obvious and in part appear hereinafter.

This application is a continuation-in-part of our copending application Serial No. 695,630 filed September 9, 1946.

There were, prior to the invention disclosed in said prior application, many known means for reclaiming rubber, both by batch processes and progressive processes, but none of them have solved the problem of producing a reclaimed product of highest quality at a cost which is attractive in competition with other available materials. The problem has remained unsolved for many years while the demand for a better reclaiming process has steadily mounted.

In accordance with the present invention there is provided means whereby all portions of the rubber under treatment are subjected progressively to a treatment adapted to give it the desired increased plasticity and to impart other advantageous properties to it, and the apparatus is specially designed to give close control of the treating conditions whereby the treatment of each part of the rubber in each part of the apparatus is terminated before the rubber can be undesirably affected. By use of the apparatus, there is produced a product, especially a reclaimed rubber of uniform quality and at a continuous rate. This when used with the short-period process, and the special oxido-reclaiming agents described and claimed in the patent of Joseph Clifton Elgin and Edward F. Sverdrup, No. 2,415,449 issued February 11, 1947, and copending applications, Serial No. 618,573, filed September 25, 1945, which has become abandoned, and Serial No. 695,630 already referred to, permits a greater efficiency and improvement on said inventions by bringing each part of the rubber to the desired point on its plasticization curve and then arresting the action. Further, in accordance with the invention there is provided apparatus particularly adapted for carrying out such treatments expeditiously and effectively.

2

It is an important feature of the invention to provide heat-exchange surfaces with means for conveying heat thereto or therefrom and means for working the material against such surfaces through successive clearances so small as to assure mechanical working and intimate contact of every particle thereof with the heat-exchange surface. After each such passage the material is extruded into a larger space where the material is mixed and allowed time for action of heat and any reclaiming agents before being forced through the next narrow clearance. The adjustment of the clearances and the number of points of close clearance controls to a large extent the character of the treatment, the production rate, and the quality of the reclaim; the more points of close clearance, the less chance there will be that any particle can pass through the device without full treatment substantially equal to every other particle. Refining of the stock is accomplished (or made unnecessary) in this apparatus by having the clearance or clearances near the discharge end of the apparatus of a dimension such as would be used in ordinary refining mills.

Best results are obtained by the use of screw means in a jacketed tubular vessel, whereby the material is treated in an annular passage between the screw and the vessel by repeated extrusion over the thread of the screw. The jacket around the tubular vessel, or other heating chamber, is connected to circulate a heat-exchange fluid so that heat is withdrawn from the zones where heat is generated and transferred to the zone in which the rubber is being heated to the treating temperature known to be effective for reclaiming the particular materials being treated. Advantageously the material is treated in intimate contact with a channel wall held within a temperature range from approximately 300° F. to approximately 500° F. during the active treatment, and with the apparatus of this invention the temperature of the stock during treatment is kept under close control. This heat exchange from and to the peripheral wall serves a further function in keeping the tackiness and adhesion on the cylindrical wall of the chamber greater than in the helical channels of the screw, so that the material will be driven forward and not merely rotated. Each part of the stock in turn, remains under such temperature conditions for substantially the same time, which for best results should be not substantially less than one minute nor substantially more than twenty minutes. Reduction of the amount of reclaiming agent below an optimum amount requires higher temperatures; whereas with the preferred devulcanizing agents, softeners, etc., lower temperatures and higher working speeds can be used. Too high temperature in the treating zone may result in shear in the stock in preference to uniform plastic working. Increasing the temperature above 400° F. adversely affects the tensile strength, but it does make a softer stock which permits high production rates. With vulcanized Hevea rubber, such for example, as pre-war inner tube scrap, and added ingredients of the preferred types specified below, a most desirable temperature range is 380°–410° F.

Heating is direct and internal, due to the internal mechanical working. The energy input rate for the types of material given below is advantageously of the order of 1.0 to 0.1 horsepower hours per pound of rubber. It is an important advantage of this invention that during continuous production this power input remains substantially constant. In its more specific aspects the invention contemplates an energy input relative to the flow rate of about .15 to .83 horsepower hours per pound.

The stock after it leaves the treating zone should be cooled substantially below the treating temperature, in most instances below about 350° F. and advantageously below 300° F. As soon as possible after the rubber is discharged into the open atmosphere, it is advantageously cooled to approximately room temperature.

One or more restricted orifices, desirably including an annular one aligned with the annular passage, serve to control the rate of flow, imposing a back-pressure to assure the desired action of the screw, to allow only fully plasticized material to escape, and to cool the product to a temperature at which it is stable when discharged. A narrow orifice of annular or other shape may be used, with passages for circulation of cooling fluid, or fins, closely associated therewith to carry off heat from the treated product while it is in thin section in the orifice. An orifice of larger size can be broken up into more restricted openings by fins, screens, etc. to give the desired effects of a narrow orifice. The provision of a plurality of orifices in series, especially an annular orifice having a rotatable side and a non-rotatable side utilized in conjunction with an annular orifice having sides both of which are non-rotatable, is useful in achieving flexibility of adjustment and control.

The orifice or orifices should provide an effective resistance, as, for example, a resistance sufficient to require an energy input rate of from 1.0 to 0.1 horsepower hours per pound of vulcanized rubber being reclaimed as set forth above.

Rates of feeding and forcing of the material into and through the feeding zone, within the limits stated, depend to considerable extent upon the nature of the material being treated and of the added ingredients, the temperature at which the treating zone is maintained, the severity of the mechanical working to which the material is subjected, and the kind of product which is desired. For ordinary rubber reclaiming and using the preferred ingredients as specified herein, the rate of flow is adjusted to give a time in the treating zone of two to three minutes.

The speed of relative movement between the material being treated and the surfaces which exert the mechanical working and friction is important, not only for the purpose of heating, but also with respect to the mechanical action.

If this speed is too high, and especially if little or no ingredients are added to hasten the development of plasticity in the mass, the mass of vulcanized rubber may merely shear along a surface of movement and smear at that surface without adequate working and plasticizing of the remaining parts of the mass. This is in part controlled by the fact that in the plasticator of the present invention the screw is formed with shallow valleys and narrow clearances between the threads of the screw and the walls of the tubular chamber, as well as varying thread constructions in the plasticating and working sections, as shown, to assure that every part of the mass must pass repeatedly through narrow clearances into wider spaces in the high temperature zones with thorough mixing before being discharged. If shear failure and resultant slippage in the mass does occur, the condition is improved by reducing the speed of operation.

Usual reclaiming agents may be used. The process is most advantageous, however, with the oxido-plasticizing agents described and claimed in Patent No. 2,415,449 and application Serial No. 618,573 mentioned above. Among these, for instance, are the mercaptans, organic sulfides and disulfides, amines, terpinolene, and the like. When oxido-plasticizing agents according to the said prior applications are used in the present process, they are advantageously pre-mixed with the stock in the presence of oxygen at temperatures below about 250° F. In general, however, it is feasible also to supply all materials continuously in proper proportion and to rely on the mechanical working of the plasticator apparatus for mixing. In addition to the reclaiming agents, usual softeners may be used, such, for example, as mineral oils, pine tars, coal tars, fatty acids, resins, etc. Naftolen R–100, a commercial resinous product recovered from acid sludge of petroleum refining, Staybelite resin, a hydrogenated rosin product in common use under that name, B wood rosin, Phillips Reclaiming Resin No. 1, a petroleum resin commercially offered to the reclaiming industry, stearic acid, oleic acid, 2-ethyl butyric acid, may be used with good results. Solvents, e. g., naphtha, Solvesso No. 3, an aromatic petroleum solvent, Rubbersol, a pine product containing about 40% terpinolene, etc., may be used in small amounts to distribute other ingredients and/or control initial plasticity of the mixed material. The inclusion of gel inhibitors such as lecithin or lignin, etc., which is particularly described and claimed in a copending application of Joseph C. Elgin and Edward F. Sverdrup, Serial No. 778,062, filed October 6, 1947, improves both the efficiency of the process and the quality of the product, and particularly makes more stable certain advantages of the product obtained with the apparatus of the present invention. Moisture is well tolerated in small amount of the order of a fraction of a per cent to a few per cent, e. g., 0.5%–2.0%. Not only natural rubbers, but the other vulcanized conjugated diolefin polymer materials such, for instance, as Buna S (GRS), Buna N, neoprene, etc., and, in certain instances, butyl rubber and the like, and mixtures thereof with each other and/or with other materials, can be effectively reclaimed in the apparatus of the present invention.

Pre-mixing of the ingredients, if practiced, should be at a temperature sufficiently low to avoid deterioration, preferably not over 250° F. and advantageously in the presence of air. The mixture should be supplied to the reclaiming apparatus of the invention in finely divided form. The vulcanized rubber scrap should be cleaned and ground in the usual way, advantageously to a fineness of 12, 24 or better 35 to 40 mesh, and be free from metal or other foreign ingredients which might injure or interfere with the reclaiming apparatus. Fiber may be present in small amounts, but decreases efficiency of operation. This crumb rubber mixed with reclaiming agents, softeners, etc., is supplied in sufficient quantity to keep the working space of the reclaiming apparatus filled and to maintain a continuous flow through it. Advantageously, the initial "forcing" section of the screw has a capacity enough greater than that of the discharge orifice to at least equal the volume of voids in the comminuted material supplied to the apparatus, so that the air is squeezed out before the material is plasticized.

Once the desired reactions have taken place, the product should be cooled quickly to bring about the transformation of the material from its reactive state to a stable condition. Such cooling may be effected according to the present invention in certain of its aspects by means of an extrusion orifice provided with fins or coolant passages, or by a spray directed against the product discharges. The material may be cooled with exposed fins or with passages for circulation of a coolant, or a spray or jet device may be positioned adjacent the product discharge to cool the product by direct contact with the cooling fluid. For this purpose either gas or liquid can be used including air, a cool inert gas (e. g. $CO_2$), or a cooling liquid, such ordinarily as water, which may be flowed from a pipe or trough or jet or, preferably, sprayed by any convenient spray device or merely maintained as a cooling bath in a vessel positioned close beneath or surrounding the product discharge orifice. The treated material may also be fed down into a standard cool mill, or cooled by other suitable apparatus. Storage temperatures should be not appreciably above room temperature. Surprisingly, cooling in an atmosphere of cold $CO_2$ improves the product, giving more uniform texture and better plasticity and appearance.

The orifices are important to this apparatus, as they afford control of the product. Given a narrow orifice at a proper temperature at a proper point, and a maintained extruding force in the material under treatment prior to this point, only material which has reached a given plasticity limit can flow through the orifice, and thus the treatment continues until the material reaches such limit, whereupon it is discharged. For the same reason, in a given operation the size and temperature of the orifice control the pressure at which the apparatus operates. If the orifice is sufficiently narrow, the pressure increases until it becomes sufficient to extrude the material and then stabilizes. In all cases, the capacity of the orifice at the operating pressure should be less than that of the screw so that the stock has to flow back over the flights of the screw. If the size of the orifice is too great, the desired internal extrusion over the threads of the screw will not take place before the material is extruded through the orifice. If the size of the orifice is too small, the device may become choked and plasticizing effectively cease.

Highly effective types of apparatus as contemplated by the invention are illustrated in the accompanying drawings.

In the drawings:

Figure 1 is a longitudinal sectional view of a form of apparatus adapted for carrying out the invention and embodying the same;

Figure 2 is a similar section on an enlarged scale of the left-hand end thereof;

Figures 3a, 3b, 3c, and 3d are fragmentary sectional views illustrating various of the wear surfaces;

Figure 4 is a vertical sectional view showing the interior of a larger worm showing one form of interior-cooling arrangement;

Figure 5 is a similar view showing an alternative form;

Figure 6 is a similar view showing still another form;

Figures 7 and 8 and 9 are partly sectional end views of the apparatus equipped with alternate forms of exterior cooling means;

Figure 10 is a fragmentary sectional view showing an alternative form of forcing means; and Figure 11 is an enlarged detail view of a section of the worm.

In the form of apparatus exemplified in Fig. 1, crumb material to be reclaimed is supplied to a hopper having a feed opening 5'. The material drops from the hopper 5 into a tubular chamber 6 in which is a screw type rotor 7. This screw is connected to suitable driving means through the drive gear 8 and speed reducer 8'. In this, the parts are drawn to scale, e. g., for a 3-inch inner diameter of the tube.

In certain longitudinal portions of the chamber 6 there are provided flights 9<sup>a</sup> and 9<sup>b</sup> of the rotor which are designed with sloping, rounded contours, thus permitting a portion of the material to work over the flights 9<sup>a</sup> and 9<sup>b</sup>. In other longitudinal portions of the rotor, its flights 10 are designed as a typical forcing screw so as to engage the material and feed it continuously along the chamber 6. The clearance at the tops of flights 9<sup>a</sup> and 9<sup>b</sup> may be $\frac{1}{32}$ of an inch. The depths and differences in contours in the several portions of the rotor are designed to produce mechanical working of the material while maintaining it in intimate relation with the wall of chamber 6, the temperature of which is controlled by fluid circulating in jacket 11, 12, 13. Pursuant to the invention, there are provided a plurality of said portions.

This arrangement facilitates the mixing of diverse materials, for instance, different types of scrap including various conjugated diolefine polymers as well as the added reclaiming agents, softeners, etc., and helps to prevent any portion being merely carried along unplasticized by "hiding" in a low part of the flight and sliding along the screw.

As exemplified in Figs. 1–2, the screw thread is formed to provide two "plasticizing" sections 9<sup>a</sup> and 9<sup>b</sup> flanked by three "forcing" sections 10 as indicated. In these sections heat is rapidly developed by mechanical working of the material and friction against the moving parts, which provides (in connection with external heating or cooling if desired), the appropriate reclaiming temperature, e. g. around 400° F., or other temperature within the reclaiming range.

The temperature of the chamber 6 is controlled in the present instance by a jacket in which a suitable heat exchange fluid, e. g., oil, Dowtherm (eutectic of diphenyl and phenyl ether), or even steam, is circulated. As shown three chambers 11, 12 and 13 surrounding the conduit make up the jacket for the chamber 6. A heater is provided in the thermostatic storage tank 15 for initial heating-up and for boosting the temperature of the heat-exchange fluid, if internal heating of the material should be insufficient. In operation, however, it is best to heat by mechanical working so that the jacket actually carries off heat and serves mainly as a temperature control means. The fluid runs through pipe 16 to chamber 11, through pipe 17 to chamber 12, through pipe 19 to an auxiliary or step-up heater 20 and thence through pipe 21 to chamber 13, returning to the thermostatic storage tank 15 through pipe 22. A pump (not shown) may be used.

At the discharge end of the screw part of rotor 7 and chamber 6 is an extrusion section composed of a conical extension 25 on the rotor 7 and an extension 26 of the chamber 6. The clearance between these parts is such that only well-plasticized rubber flows through it; and such rubber is cooled by intimate contact, in thin section, with the wall of chamber 26. By virtue of the conical form this section provides smooth tubular flow, and prevents laminar flow; but it is advantageous to increase the clearance progressively as the diameter decreases so that the area of the annular opening remains constant or even increases toward the small end of the cone. The area of this orifice, and to a considerable extent also its temperature, control the rate of flow of the material being treated.

Dissipation of heat generated by mechanical action during extrusion through zone 27 and some cooling of the stock below its temperature in the active treating zone is carried out in zone 27.

From the zone 27 the material gathers in a chamber 31, whence it passes into the annular chamber 32, in which it is then subjected to further cooling and compacting by extrusion through the annular orifice between the cone 33 and the cylinder. This is adjustable by turning nut 36 on the threaded pin 35. This also produces back-pressure which affects the rate of flow, and assures the exclusion of air.

In the zones 27, 31 and 32 the temperature is reduced, by external cooling, from one within the reclaiming range (of over 325° F.; e. g., 325–425° F.) to one not over 325° F., and preferably lower.

The cone 25, the tube 34 and the conduit 31 are, respectively, cooled by jackets 39, 40 and 41 through which a cooling liquid, e. g., water at controlled temperature, e. g. at about 175–195° F., is circulated from pipe 44 and by pipes 42 and 43. A discharge pipe 47 runs from jacket 41 to a recycle cooler end pump or to discharge.

The apparatus is drawn substantially to scale in Fig. 1 for a 3" outer diameter screw. The space 21 between the cone 25 and the tube 26 may be about 0.030", but is adjustable by the bolt 30 engaging nut 30' secured to the bed of the machine. The orifice at the outlet of chamber 32 may be 2½" in external diameter and 2¹¹⁄₃₂" in internal diameter.

Due to the high forcing action in the forcing sections and the high pressure and varied rate in the plasticating sections and to both factors in a particularly high degree at the extrusion cones, high wear characteristics ensue and a very exceptional degree of wear resistance is required. Stainless alloy steels have been used with some improvement over ordinary steels, but, because of the high abrasion and corrosion effects of the material under treatment, replacements are still required far more often than is desirable from either the standpoint of the characteristics of the finished product or from the standpoint of economy. We have found that by the use of chromium plating, even in very thin layers on various of the surfaces which are thus subjected to wear, the life of these surfaces is multiplied many times. The anti-corrosion and anti-abrasion effects of the chromium is greatly increased over normal, apparently because of the high reducing conditions which subject ordinary wear-resistant metals to exceedingly rapid wear and even to pitting. A very surprising additional factor is that skin build-up of carbonized rubber on the surfaces of the chambers and cones is very markedly reduced over results with high alloy steels, when a chrome plate is employed. As exemplified the interior of the chamber 6 is provided by a removable liner 48 the interior 49 of which is covered by a thin chrome-plated surface 50 as more particularly exemplified in Fig. 3a. Similar chrome coverings are provided at 51 on the cone 25, at 52 on the interior of the chamber 27, and at 53 on the chamber 31; as shown in Fig. 3b, and at 54 on the surface of the cone 33, and at 55 on the interior of the annular chamber 32, as shown in Fig. 3c. Increased wear resistance and effectiveness may also be obtained by flowing colmonoy, or plating tungsten alloys or the like on the screw, the liner, or other of the wear surfaces, or portions thereof.

Replacements of the liner are minimized by forming it of nitrided low-chrome steel so that it will resist wear in any spots where the chromium plating may have become injured or worn.

A chrome plating on the screw adds greatly to its wear resistance. In some instances there is a tendency for the material to stick to the screw and rotate in the chamber, with resultant irregularities in flow, instead of being forced forward by the screw. A modified form of construction which may be employed to meet such difficulties when they occur is exemplified in the modification of Figure 3d wherein the roughened surface may be provided by ordinary or exceptionally rough tooling, or by etching. It may be protected by a thin chrome plate. A chromium plate 57, or a colmonoy surface may be used on the screw in some instances.

Control of the difference in the coefficient friction of the liner and the screw may in other cases be effectuated by variations in the temperature of the screw and the liner.

The maintenance of uniform temperature is important and since many of the reactions taking place in rubber being reclaimed are exothermic, the oil flow through the jackets will often serve a cooling rather than a heating function, particularly as the plasticating has proceeded and the exothermic plastization reactions have progressed.

Increased capacity may be obtained by using a screw of the same length, but of larger over-all diameter. This provides working spaces of generally similar radial extent, but with greatly increased cross-sectional area.

Furthermore, other things being equal, the more heat that can be generated directly in the material itself rather than being transferred through the retaining wall from without the quicker and more effective will be the results. For example, it is highly desirable to heat each particle of material quickly and uniformly to the desired temperature so that the plasticising reaction may proceed uniformly throughout to bring all the material uniformly to the desired point in a fixed time. Uniform operating and wear characteristics are also important desiderata. It is desirable that a maximum of heat be generated by the forcing and plasticating action of the screw. To these and other ends the invention in certain of its aspects contemplates the provision of especially shallow valleys. The valleys throughout the major portion of the length of the screw may, for example, have a depth well under a half inch and, advantageously, may be five-sixteenths of an inch or less. The depth in the initial portion of the first forcing section may be greater, but only slightly so, as, for instance, one-half to five-eighths of an inch, and in later portions of the screw the depth should be definitely less than this, though it may run as high as seven-sixteenths of an inch or even fifteen thirty-seconds of an inch in some instances. In this manner, very rapid transfer of heat from or to the walls of the chamber is made possible. A variation in the depth of the valleys is advantageous moreover, insuring a thorough and effective working of the material.

By mixing with an oxido-plasticization agent in the presence of air, sufficient oxygen for activating the agent so as to bring about the desired plasticizing reactions, including chain-scission, is incorporated, and, when the material enters the reaction chamber, it is fully compacted by the worm, and the reactions occur in the substantial absence of air. Thus the oxidation reaction is controlled, and the material protected against excessive oxidation degradation.

In many instances it is desirable to control the temperatures at various points beyond the initial section or sections. Moreover, cooling the material in the annular extrusion orifice 27 surrounding the cone 25 is highly important, as is also at times cooling at this point and controlled cooling at the forward portions of the screw. Internal cooling at these points is advantageous from a standpoint of balanced action and effective control. There are exemplified in Figs. 4, 5, and 6 forms of construction which embody these features, but, which are otherwise, except as illustrated and indicated below, generally similar to the machine shown in Figs. 1–3c. The outer worm diameter is six inches, but the valleys between the threads are only ½ of an inch deep except in the initial forcing section where the screw starts at ⅝ of an inch and tapers to 3/32 of an inch.

A construction of this type is exemplified in still greater detail in Fig. 11. The threads in the plasticating sections are specially formed, as shown at 59, to facilitate the working of the material. In addition means are provided for exerting a major cooling effect within the initial extrusion cone, a smaller cooling effect at the closely adjacent end portion of the screw, and substantially no interior cooling effect throughout the remainder of the screw.

As exemplified in Fig. 4, an inflow pipe 60 runs through the center of the screw 7 to the initial end of which an inlet connection 61 is secured. The inflow pipe 60 terminates at 62 within a chamber 63 occupying much of the interior of the cone 25. From the chamber 63 a passageway 64 leads backward through a threaded connector 65 to a passageway 66 in the interior of the screw. The cold water coming out at 62 tends to chill the cone 25 down to the desired temperature, and, as it passes back through the passageways 64 and 66, tends to chill the end portion of the screw (throughout, for example, the third forcing section), but to a lesser extent since the water by this time will have been considerably warmed up by the heat absorbed in the compartment 63 and during its rearward movement therefrom. In order to prevent chilling of the earlier sections, the return pipe 68 surrounding the pipe 60 is provided within an insulating air space 70, which, as exemplified in Fig. 4, is of the same cross-sectional area throughout the remainder of the extent of the screw. An outlet connection 71 permits the discharge of the warmed water from the outlet pipe 68.

When additional cooling at an earlier point is necessary this may be secured by providing orifices 72, as exemplified in Fig. 5, from the return pipe 70 to an uninsulated supplemental chamber 72' having return orifices 72''. The pipe 70 is slightly restricted to assure the proper flow through the orifices.

As an alternative or supplemental type of temperature control the size of the air space 70 may be varied at different points along the length of the screw. As exemplified in Fig. 6, the air space is enlarged near the earlier portion of the screw as indicated at 73, is somewhat smaller at a central portion as indicated at 74, and is still smaller as the chamber 66 is approached as indicated at 75.

If the temperature of the cooling fluid supplied by the pipe 41' is sufficiently low and its rate of flow sufficiently high, the treated stock may be extruded from the annular channel 34 directly into the open air. If, on the contrary, the temperature of the extruded stock is so high that further changes in the stock such as oxidation, burning, melting or stiffening would result, the stock is positively cooled, e. g., as shown in Figs. 7, 8, and 9. In Fig. 7 the stock extruded at 80 in tubular form falls into the path of a jet 81 of inert gas such for instance as carbon-dioxide from a pipe 82. This gas may come from any source, but is shown diagrammatically as coming from the chamber 85 in which the stock is cooled and collected, being driven by a pump or blower 84 through a cooler 83 to the outlet 82.

In Fig. 8, the material extruded at 80 drops into a bath 90 of a cool liquid such, for instance, as water, which is supplied by a pipe 91. The material is carried off by a conveyor 92.

In the instance shown in Fig. 9 the material extruded at 80 passes through a spray 95 of cooling liquid, such, for instance, as water from pipes 96 and 97 and is then carried off by a conveyor 98. Water is withdrawn through a pipe 100.

It is also feasible to extrude the material directly from the chamber 31 or 27 into an inert cooling bath or atmosphere. The cooling may be performed entirely after extrusion.

The diameter of the screws and chambers may be varied widely but with increased diameter. The lengths may remain substantially the same regardless of variations in diameter. The speed of operation will ordinarily be varied to maintain the desired process time of through-passage. For example, there have been provided screws of 3 inch diameter, 6 inch diameter, or 12 inch diameter, with respective speeds of 60 R. P. M., 40 R. P. M., and 20 R. P. M.

Using a machine with a 6 inch diameter screw, flow rates of between 280 and 300 pounds per hour have been obtained with an oil temperature through the piping 16—22 of 280° F. at an oil flow of 9 gallons per minute. Temperatures below 280 tend to lower the rate of extrusion, and temperatures as high as 330° F. have tended to result in unsteady operating conditions. An oil temperature of 320° F. is desirable if the oil flow is raised above 11 gallons a minute. The water flow rate in the piping 41'—47 is desirably between one and one and one-half gallons per minute at a temperature about 208° F. for a production rate of 280–300 pounds per hour. The machine is effectively operable in ranges as high as 400–500 pounds per hour.

There is exemplified in Figs. 10 and 11 a machine generally similar to those exemplified above, but with a screw having an over-all diameter of twelve inches. The parts are designated by reference numerals similar to those used in Fig. 1, but with the addition of the subscript c. The operation and effect of this is generally similar to the operation and effect of the machines of Figs. 1–6, but various improved features are embodied, and the production rate is enhanced and improved, and other advantages, including greater uniformity of result, are obtained. The clearance between the screw threads and the liner at 105 is about six thousandths (0.006") of an inch. The valleys 106 in the screw start at 5/8 of an inch or more in the initial forcing section which tapers to 1/16 of an inch. They are 1/16 of an inch deep in the first plasticating and second forcing sections, 1/16 of an inch in the second plasticating section, and 3/8 of an inch in the final forcing section. By the provision of these shallow valleys effective heat transfer conditions are maintained and pressure build-up is kept low as the raw scrap initially enters the plasticization reaction zone so as to avoid concentration of wear. In the exemplification of Fig. 10 additional initial control is achieved by providing a longer initial forcing section, additional turns of the screw 7c being provided at 107 so that the initial forcing section is longer than either of the plasticating sections as well as being longer than the later forcing sections.

With the exceptions of differences in the length of the first forcing section, the lengths of the screw and of the parts thereof are uniform throughout the various figures in the present instance. Further data on the present exemplifications are given below:

| Screw diameter..........inches.. | 3 | 3<br>Fig. 1 | 6<br>Fig. 4 | 12<br>Fig. 10 |
|---|---|---|---|---|
| Taper of 1st Forcing Section do.... | 5 | 7½ | 12¹³⁄₁₆ | 29¾ |
| Valley depth in: | | | | |
| 1st Forcing Sec........do..... | ⅝ | ½ | ⅝ | ⅝ |
| 1st Plasticating........do..... | ⁹⁄₃₂ | ³⁄₃₂ | ⁹⁄₃₂ | ⁵⁄₁₆ |
| 2nd Forcing: | ⁵⁄₁₆ | ³⁄₁₆ | ¹⁵⁄₃₂ | ⁵⁄₁₆ |
| 2nd Plasticating........do..... | ⁹⁄₃₂ | ¹¹⁄₃₂ | ¹⁵⁄₃₂ | ⁷⁄₁₆ |
| 3rd Forcing...........do..... | ⁵⁄₁₆ | ⅜ | ¹⁵⁄₃₂ | ⅜ |

In this specification and the accompanying drawings we have set forth certain embodiments and specific examples of operations which may be carried out by the invention and have suggested various modifications and alternatives. It should, however, be understood that these are not intended to be exhaustive or limiting of the invention, but on the contrary are given with a view to enabling others not only to practice the invention, but so fully to understand it and the principles thereof that they will be enabled to modify and adapt these examples and to embody into the invention in many forms, each as may be best suited to the conditions of a particular use.

For instance, under varying conditions the lengths of the various sections have been varied as follows:

| Screw diameter..........inches.. | 3 | 3 | 6 | 12 |
|---|---|---|---|---|
| 1st Forcing Section.........do.... | 6 | 7½ | 6½ | 24 |
| 1st Plasticating.........do.... | 6 | 6 | 7¼ | 17⅝ |
| 2nd Forcing Section.........do.... | 4 | 4 | 4½ | 18¾ |
| 2nd Plasticating.........do.... | 6 | 6 | 7⅞ | 17⅞ |
| 3rd Forcing Section.........do.... | 5 | 3½ | 6⅛ | 13½ |

Certain examples of procedures which may be carried out by means of the invention are given below.

Although it is difficult to measure actual stock temperatures, it is believed that the temperatures given below, which were determined by thermocouples in the chamber walls close to the stock, are within 25° of the average temperature of the stock in the cross-section at the thermocouple location. The thermocouples were between ½" and ¼" from the inner surface of the chamber 6, the forward thermocouple being disposed 6⅝" rearwardly of the rear end of the cone, the "center" thermocouple 5⅝" farther to the rear and the "rear" thermocouple 6⅛" further.

Example 1

Ninety-five parts by weight of vulcanized butyl rubber inner tube stock, comminuted to about 12 mesh were pre-mixed in the presence of oxygen, at room temperature, with two parts of Rubbersol #3, 2.4 parts of Staybelite resin (a rosin derivative sold by Hercules Powder Co. of Wilmington, Delaware), 1.2 parts of stearic acid, 0.5 part of mono-ethanol amine, 0.5 part of lecithin, and 1.5 parts of water. The mixture was introduced into the hopper 5 of the device of Fig. 1, with extrusion into air and run through the device with a jacket temperature varying from 298° in the pipe 16 about a foot from the chamber 11 to 307° F., in the pipe 22 about a foot from the chamber 13, a temperature of 306° in the "rear," 336° in the "center" 12, 364° "forward," 183° at the entrance to the cone 26, and 185° at the end of the cone 26; the temperature in the interior of the rod 35, 6" from the top of the die, being 309°; this temperature being probably 25°–50° lower than the stock in the die. The temperatures were taken by thermocouples in the wall of the tube within ½" from the inner tube surface. The "forward" thermocouple was disposed 6⅝" rearwardly of rear end of the cone, the "center" thermocouple 5⅝" rearwardly, and the "rear" thermocouple 6⅛" further rearwardly. The stock was run through at a speed of 42.6 pounds per hour at 11.4 horsepower, a worm speed of 48 R. P. M. and a duration of treatment of 4.4 minutes in the chamber 6. The product had a specific gravity of 1.131 and a plasticity number of 4.31. When compounded with 2.50 parts by weight of zinc oxide, 0.50 part of stearic acid, 0.60 part of captax, 0.60 part of ethyl selenac, 0.60 part of tuads, and 1.25 parts of sulfur for each one hundred parts of reclaim, and cured for thirty minutes at 60 pounds steam pressure, it gave a tensile strength of 2327 p. s. i., elongation 84.3% and a hardness of 45. When cured for forty-five minutes at sixty pounds steam pressure, it gave a tensile strength of 2356, an elongation of 82.3% and a hardness of 46.

Example 2

Using the machine of Fig. 1, with extrusion into air, ninety-five parts by weight of 24 mesh natural rubber tire tread peels were pre-mixed at a temperature below 250° F., with 0.5 part of tertiary lauryl mercaptan, 1.5 parts of Solvesso #3, 1.5 parts of engine oil, 0.5 part of lecithin, and 1.5 parts of water and run through the machine of Figure 1 with a worm speed of 48 R. P. M. The temperatures were as follows:

300° F. in the intake pipe 16
   320° F. in the outlet pipe 22
   350° F. rear
   361° F. center
   362° F. forward
   150° F. at the rear of the cone
   144° F. at the forward end of the cone
   326° F. at the die The stock moved through at 49.4 pounds per hour with a power input of 10.5 horse power and a transit time of 3.8 minutes for passage of stock along the length of the chamber 6. The product was a good quality reclaim with a specific gravity of 1.143 and a plasticity number of 4.70.

Example 3

Using the machine of Figure 1, with extrusion into air, ninety-five parts of twelve mesh black bus and truck tubes grounds to crumb were mixed 2 parts of Rubbersol, 1.2 parts of stearic acid, 2.4 parts of B wood rosin, 0.5 part of monoethanol amine, 0.5 part of lecithin, and 1.5 parts of water and run through a machine generally similar to that of Figure 1.

The temperatures were as follows:

253° F. oil inlet
   273° F. oil outlet
   279° F. rear
   336° F. center
   365° F. forward
   350° F. at the die
   174° F. at the forward end of the cone The stock was run through at a rate of 43.8 pounds per hour at a worm speed of 60 R. P. M., using 9.5 horse power. The transit time for passage of stock from the feed end of the screw to the cooling chamber 27 was 4.3 minutes. The product had a specific gravity of 1.122 and a plasticity number of 3.85.

Example 4

A mix such as described in Example 3 was processed similarly in the same machine, the temperatures being as follows:

345° F. oil inlet
   350° F. oil outlet
   357° F. rear
   411° F. center
   407° F. forward
   360° F. die
   155° F. forward cone and was run through at a rate of 52.5 pounds per hour at worm speed of 60 R. P. M., at approximately 10 horse power and a transit time of 3.5 minutes. The product had a specific gravity of 1.120 and a plasticity number of 2.79.

Example 5

Ninety-five parts by weight of 30 mesh natural rubber #1 peels were mixed with 0.5 part of tertiary lauryl mercaptan, 1.5 parts of Solvesso #3, 1.5 parts of engine oil, 0.5 part of lecithin, and 1.5 parts of water and run through at a worm speed of 60 R. P. M. The temperatures were as follows:

301° F. oil inlet
   316° F. oil outlet
   351° F. rear
   370° F. center
   368° F. forward
   152° F. rear cone
   158° F. forward cone
   318° F. die The stock moved through at 52.9 pounds per hour with a power input of 11.2 horse power and a transit time of 3.5 minutes. The product was an excellent quality reclaim with a specific gravity of 1.143 and a plasticity number of 4.70.

Example 6

Using the machine of Figure 1, with extrusion into air, a mix of 95 parts by weight of 24 mesh Buna S peels were mixed with 1.5 parts of tertiary lauryl mercaptan, 18 parts of Phillips Reclaiming Resin, No. 1, 1.5 parts of tertiary butyl catechol, 0.2 parts of 2-ethyl butyric acid, and 1.5 parts of water was used.

The temperatures were as follows:

304° F. oil inlet
   322° F. oil outlet
   374° F. rear
   383° F. center
   385° F. forward
   238° F. rear cone
   219° F. forward cone
   249° F. die The stock was run through at about 9.6 pounds per hour, a worm speed of 60 R. P. M., 8 horse power, and a contact time of 19.4 minutes. A very smooth product with specific gravity of 1.147 and a plasticity number of 5.35 was produced.

Example 7

Using the machine of Figure 1, with extrusion into air, a mix of 95 parts by weight of twelve mesh crumb, Buna S hot water bottles scrap were mixed with one part of tertiary lauryl mercaptan, 1.5 parts of Solvesso No. 3, 1.5 parts of engine oil, 0.5 part of lecithin, 1.5 parts of water, was run through a machine as shown in Figure 1 with the rotor operating at 70 R. P. M. The temperatures were as follows:

322° F. oil inlet
   342° F. oil outlet
   376° F. rear
   403° F. center
   399° F. forward
   307° F. die
   241° F. forward cone The stock was run through at a speed of 25.4 pounds per hour 13.7 horse power, and a transit time of 7 minutes. There was produced a flat product which, although dry and hard, had very desirable properties. The specific gravity was 1.478 and the plasticity number 6.10.

Example 8

Using the machine of Figure 1, with extrusion into air, a mix of 47.5 parts of twenty-four mesh Buna S tire tread peels and 47.5 parts of twenty-four mesh natural rubber peels were mixed with 0.5 part of tertiary lauryl mercaptan, 1.5 of Solvesso No. 3, 0.5 part of lecithin, 0.2 part of 2-ethyl butyric acid, and 1.5 parts of water and passed through a machine similar to that of Example 1 with a worm speed of 60 R. P. M. and a cone clearance of 0.017". The temperatures were as follows:

307° F. oil inlet
    329° F. oil outlet
    364° F. rear
    400° F. center
    386° F. forward
    417° F. die
    204° F. forward cone The stock was run through at a rate of .73 pounds per hour and 15.1 horsepower. The transit time was 2.5 minutes. The product had a specific gravity of 1.168 and a plasticity number when refined of 4.62.

Example 9

Using the machine of Fig. 1, with extrusion into air, a mix similar to that of Example 8, except that there were included also 5 parts of naftolen R–100, was run through with a cone clearance of 0.018 at a speed of 45 pounds per hour at 12.6 horsepower and a transit time of 4.1 minutes. The product had a specific gravity of 1.155 and a plasticity number when refined of 4.56.

Example 10

Using a shorter, straight-line, machine, with a 20" screw having 1½" pitch reduced to ¾" pitch at the last 2". The thread for 5½" is deep forcing, for 7" plasticating, and 7½" shallow forcing. The cone pin tapers from 3" to 2" and is approximately 1¾" long. A die in line with the cone was used. 47.5 parts of 12 mesh Buna S peels and 47.5 parts of 12 mesh natural rubber peels were mixed with 1 part of tertiary lauryl mercaptan, 1.5 parts of Solvesso No. 3 and 0.5 part of lecithin and 1.5 parts of water and processed in an apparatus with a rotor speed of 70 R. P. M. The temperatures were as follows:

279° F. oil inlet
    295° F. oil outlet
    342° F. rear
    342° F. forward
    348° F. rear cone
    251° F. forward cone
    371° F. die The stock was run through at a rate of 22.1 pounds per hour at 9.2 horsepower and with a transit time of 8.4 minutes. This, on extrusion into air, yielded a good reclaim with a specific gravity of 1.173 and a plasticity number of 4.95.

Effective results were also obtained by substituting an equivalent weight of terpinolene, mono-ethanol-amine, tetra-ethylene-pentamine, dibutyl disulfide, or iso-amyl disulfide for the mercaptan.

Example 11

In a procedure similar to that of Example 9, 47.5 parts of 24 mesh natural rubber peels and 47.5 parts of Buna S peels were mixed with 1 part of straight chain lauryl mercaptan, 1.5 parts of engine oil, 1.5 parts of Solvesso No. 3, 0.25 part of oleic acid, 0.75 part of 4 tertiary butyl catechol, and 1.5 parts of water. The jacket temperature was maintained at about 385° F. with a cone temperature of 220° F., and a die temperature of 270° F. The contact time was 9 minutes, and 11 horsepower input. A good reclaim with a plasticity number of about 6.09 and a specific gravity of 1.150 was obtained.

Example 12

In a similar procedure a treatment generally similar to that of Example 11 was carried out with a contact time of 10 minutes, and an input of 12 horsepower hours, 0.5 part of lecithin and 0.2 part of 2-ethyl butyric acid employed in the mix, but no engine oil. Good results were achieved. Good results were likewise obtained using tertiary lauryl mercaptan instead of the straight chain lauryl mercaptan.

Example 13

95 parts of red inner tube scrap in crumb form of 12 mesh size were mixed with a solution consisting of 3.5 parts of Solvesso No. 3, 1 part of engine oil, and 2 parts of dioctyl disulfide. The resulting mixture was passed through a tubing machine provided with a nozzle having an annular opening a few millimeters in radius and several inches in length steam jacketed to bring the composition in the nozzle quickly to a temperature of about 400° F. and to hold it at approximately that temperature until discharged into an inert cooling bath or cooling atmosphere, by which the treatment was quickly terminated. The temperature of the mixture during passage through the nozzle was approximately 407° F. and the approximate transit time within the treating zone 3.1 minutes. The product was a reclaim of good quality with plasticity number 5.43.

Example 14

The same mixture as in Example 13 excepting for substitution of an equal amount of di-hexadecyl disulfide instead of the octyl disulfide used in Example 13, was treated in the same manner, excepting that in this case the observed temperature of the main treatment was approximately 400° F. and the approximate time of treatment 3.9 minutes. The product was a reclaim of good quality with plasticity number 5.3.

Other subject matter disclosed herein is disclosed and claimed in our copending application Serial No. 233,446 filed June 25, 1951.

We claim:

1. Apparatus useful for the reclaiming of rubber and the like comprising screw means having threads thereon which in a plurality of longitudinally spaced portions thereof are abrupt, for forcing material along the chamber hereinafter specified, and in a plurality of portions alternating with the first-named portions, being rounded for smearing and working the material against the chamber wall, one of said spaced portions preceding the first of said alternating portions, and one of said spaced portions succeeding another of said alternating portions, and still another of said spaced portions being intermediate two of said alternating portions, a chamber enclosing the screw means and having a feed opening near one end, and a restricted orifice at the opposite end of said chamber through which the material treated by said screw means is extruded.

2. Apparatus useful for the reclaiming of rubber and the like comprising tubular conducting means, feeding means leading thereto, screw means in said tubular means providing a series of interspersed working and forcing sections including a forcing section to compress the material and drive it onward, a working section beyond said forcing section in the direction of flow to work the thus-compressed material, a forcing section to drive onward the thus-worked material, and at least one forcing section beyond the last-mentioned working section, and maintain a pressure gradient in the adjacent working sections, and a working section to work the material driven from said forcing section; whereby the material is subjected to working following compression, compression following working, and working following compression; and an extrusion orifice beyond said screw means.

3. Apparatus useful for reclaiming rubber and the like comprising a working and forcing chamber, extrusion orifice outlet means therefor, input means leading to said chamber, means in said chamber for working material from said input means and forcing it thru said orifice means, a jacket portion near said input means, a jacket portion near said outlet means, means to conduct a heat-exchange fluid from the last-mentioned jacket portion to the first-mentioned jacket portion, and means to conduct a heat-exchange fluid from said first-mentioned jacket portion to said last-mentioned jacket portion.

4. Apparatus useful for reclaiming rubber and the like comprising a working and forcing chamber, extrusion orifice outlet means therefor, input means leading to said chamber, means in said chamber for working material from said input means and forcing it through said orifice means, and temperature control means including a circulation jacket near said input means, a heater, a conduit from said heater to said jacket, a circulation jacket near said outlet means, a conduit from the first-mentioned jacket to the last-mentioned jacket and a conduit from said last-mentioned jacket to said heating means.

5. Apparatus useful for reclaiming rubber and the like comprising a tubular chamber having an orifice outlet at one end thereof, a screw for forcing material thru said tubular chamber, a passage in the interior of said screw for conducting a cooling fluid forwardly to a point near said orifice, a chamber within said screw extending a short distance rearwardly from said point, and a passage exterior of the first-mentioned passage extending rearwardly within said screw, said passages being in heat-conductive relationship, an inlet connected to the rear end of the first-mentioned passage and an outlet connected to the rear end of the last-mentioned passage, and insulating means in said screw means outside substantially the entire extent of the passage connected to the outlet.

6. Apparatus useful for reclaiming rubber and the like comprising a tubular chamber, screw means in said chamber, the transverse contour of the thread at different portions of the screw means varying so as to provide for varying working and extruding action on the material along the length of the screw means, a die beyond said screw and generally in line therewith, and a surrounding wall providing with said die a restricted extrusion orifice at the end of said chamber, and an additional die and surrounding wall at a large angle from said die and wall providing also a restricted annular orifice and providing a passageway in which the direction of movement of the material will undergo a major change.

7. Apparatus useful for reclaiming rubber and the like comprising a tubular chamber, screw means in said chamber, the transverse contour of the threads at different portions of the screw means varying so as to provide for varying working and extruding action on the material along the length of the screw means, a die beyond said screw and generally in line therewith, a surrounding wall providing with said die a restricted extrusion orifice at the end of said chamber, an additional die and surrounding wall at a large angle from the first mentioned die and wall and providing also a restricted annular orifice and a passageway in which the direction of movement of the material will undergo a major change, at least the major portion of said surrounding walls being chrome plated.

8. Apparatus useful for reclaiming rubber and the like comprising a tubular chamber, screw means in said chamber, the transverse contour of the threads at different portions of the screw means varying so as to provide for varying working and extruding action on the material along the length of the screw means, a die beyond said screw and generally in line therewith, and a surrounding wall providing with said die a restricted extrusion orifice at the end of said chamber, and an additional die and surrounding wall at a large angle from said die and wall to provide a passageway in which the direction of movement of the material will undergo a major change and providing also a restricted annular orifice, at least the major portion of the walls of said passageway being chrome plated.

9. Apparatus useful for reclaiming rubber and the like comprising a tubular chamber, screw means in said chamber, the transverse contour of the threads at different portions of the screw means varying so as to provide for varying working and extruding action on the material along the length of the screw means, a die beyond said screw and generally in line therewith, and a surrounding wall providing with said die a restricted extrusion orifice at the end of said chamber, and an additional die and surrounding wall at a large angle from said die and wall to provide a passageway in which the direction of movement of the material will undergo a major change and providing also a restricted annular orifice, at least the major portions of said surrounding walls of the passageways surrounding said dies being chrome plated, and at least a major portion of the walls of said chamber being chrome plated.

10. Apparatus useful for reclaiming rubber and the like comprising a tubular chamber, screw means in said chamber, the character of the threads of the screw varying so as to provide a series of sharp-edged forcing sections and intervening round-edged plasticating sections, the initial forcing section being the longest section of said series, and restricted extrusion means at the end of said chamber.

11. Apparatus useful for reclaiming rubber and the like comprising a tubular chamber, screw means in said chamber, the character of the threads of the screw varying so as to provide successive sharp-edged forcing sections and round-edged plasticating sections, the valleys between the screw-threads in the tubular chamber throughout the major portion of the length of the screw being not over fifteen thirty-seconds of an inch in depth, and restricted extrusion means at the end of said chamber.

12. Apparatus useful for reclaiming rubber and the like comprising a tubular chamber, screw means in said chamber, the character of the threads of the screw varying so as to provide successive sharp-edged forcing sections and round-edged plasticating sections, at least certain of the valleys between the screw-threads in the tubular chamber in at least a part of the plasticating sections of the screw being not over three-eighths of an inch in depth, and restricted extrusion means at the end of said chamber.

13. Apparatus useful for reclaiming rubber and the like comprising a tubular chamber, screw means in said chamber, the character of the threads of the screw varying so as to provide successive sharp-edged forcing sections and round-edged plasticating sections, the valleys between the screw-threads in the tubular chamber being not substantially over five-eighths of an inch in depth.

14. Apparatus useful for reclaiming rubber and the like comprising a tubular chamber; screw means in said chamber, the character of the threads of the screw varying in character and providing a sharp-edged forcing screw portion, a succeeding round-edged plasticating screw portion, a succeeding sharp-edged forcing screw portion, a succeeding round-edged plasticating screw portion, and a succeeding sharp-edged forcing screw portion, an annular extrusion orifice, means to cool the material while under pressure, and means to further cool the material after extrusion through said orifice.

15. Apparatus as defined in claim 14 wherein the flow capacity of the helical channels in the forcing portions of the screw is greater than that of the channels in the working portions of the screw.

16. Apparatus useful for the reclaiming of rubber and the like which comprises means for mechanically working the rubber and means for forcing the rubber onward through the housing hereinafter specified, through said working means and through the orifice hereinafter specified, a housing closely surrounding the working and forcing means for holding the rubber against pressure exerted by said working and forcing means, an extrusion orifice beyond said working and forcing means for continuously discharging treated rubber without relieving the pressure on rubber remaining in the housing, and heat-exchange controlling means associated with said housing in the vicinity of said working means for maintaining the temperature of the interior of said housing within a reclaiming range, and heat-exchange means associated with said orifice for chilling the rubber, as it is discharged, below the reclaiming range, the heat-exchange controlling means including fluid passages in the wall of the orifice and of the housing and means for passing fluid through such passages around the orifice and the working sections of the housing and thence around the first forcing section adjacent the inlet, whereby to heat the incoming rubber to the reclaiming range by excess heat generated in the working sections and removed therefrom by the heat-exchange fluid.

JOSEPH C. ELGIN.
EDWARD F. SVERDRUP.

References Cited in the file of this patent

UNITED STATES PATENTS

| Number | Name | Date |
|---|---|---|
| 1,364,549 | Gordon | Jan. 4, 1921 |
| 1,375,623 | Bartels | Apr. 19, 1921 |
| 1,912,374 | Johnson | June 6, 1933 |
| 1,935,050 | Gordon | Nov. 14, 1933 |
| 1,964,600 | Royle | June 26, 1934 |
| 1,990,555 | Loomis | Feb. 12, 1935 |
| 2,177,633 | Blanchard | Oct. 31, 1939 |
| 2,262,989 | Conklin et al. | Nov. 18, 1941 |
| 2,319,859 | Hale | May 25, 1943 |
| 2,384,521 | Andersen et al. | Sept. 11, 1945 |
| 2,449,355 | Wiley et al. | Sept. 14, 1948 |
| 2,514,841 | Chase | July 11, 1950 |
| 2,519,014 | Bankey | Aug. 15, 1950 |

OTHER REFERENCES

"The Clay-Worker," March 1932.